United States Patent
Neuhäußer et al.

(10) Patent No.: US 11,055,448 B2
(45) Date of Patent: Jul. 6, 2021

(54) SYSTEMS AND METHODS FOR SMT PROCESSES USING UNINTERPRETED FUNCTION SYMBOLS

(71) Applicant: Siemens Industry Software Inc., Plano, TX (US)

(72) Inventors: Martin Richard Neuhäußer, Nuremberg (DE); Gabor Schulz, Fürth (DE)

(73) Assignee: Siemens Industry Software Inc., Plano, TX (US)

( * ) Notice: Subject to any disclaimer, the term of this patent is extended or adjusted under 35 U.S.C. 154(b) by 248 days.

(21) Appl. No.: 16/469,068

(22) PCT Filed: Apr. 11, 2017

(86) PCT No.: PCT/US2017/026904
§ 371 (c)(1),
(2) Date: Jun. 12, 2019

(87) PCT Pub. No.: WO2018/190800
PCT Pub. Date: Oct. 18, 2018

(65) Prior Publication Data
US 2020/0074017 A1    Mar. 5, 2020

(51) Int. Cl.
*G06Q 10/06* (2012.01)
*G06F 111/04* (2020.01)
*G06F 30/00* (2020.01)

(52) U.S. Cl.
CPC ............. *G06F 30/00* (2020.01); *G06Q 10/06* (2013.01); *G06F 2111/04* (2020.01)

(58) Field of Classification Search
CPC ..... G06F 30/00; G06F 2111/04; G06Q 10/06; G06N 5/006; G06N 7/00
See application file for complete search history.

(56) References Cited

U.S. PATENT DOCUMENTS

| | | | |
|---|---|---|---|
| 8,533,142 B2 | 9/2013 | Collier et al. | |
| 2010/0192129 A1* | 7/2010 | Langworthy | ........... G06F 8/437 717/126 |

(Continued)

OTHER PUBLICATIONS

Peter et al. "Component-Based Synthesis of Embedded Systems Using Satisfiability Modulo Theories". ACM Transactions on Design Automation of Electronic Systems, vol. 20, No. 4, Article 49, Pub. date: Sep. 2015. 27 Pages. (Year: 2015).*

(Continued)

*Primary Examiner* — Eunhee Kim

(57) ABSTRACT

Systems and methods for SMT processes using uninterpreted function symbols. A method includes receiving a configuration model. The method includes computing a variant for the configuration model that includes a non-linear function. The method includes identifying input/output pairs in the non-linear function of the variant. The method includes executing a process on an external application for each input/output pair to produce an output value corresponding to each input of the input/output pairs. The method includes comparing the output value corresponding to each input of the input/output pairs with the output corresponding to each input of the input/output pairs. The method includes, when the output value corresponding to each input of the input/output pairs is equal to the output corresponding to each input of the input/output pairs, then the system stores an indication that the variant is correct.

18 Claims, 3 Drawing Sheets

(56) References Cited

U.S. PATENT DOCUMENTS

2011/0055237 A1* 3/2011 Veanes .................... G06F 16/33
　　　　　　　　　　　　　　　　　　　707/759
2017/0293549 A1* 10/2017 Yu ....................... G06F 11/3608

OTHER PUBLICATIONS

PCT Search Report dated Dec. 19, 2017, for PCT Application No. PCT/US2017/026904, 11 pages.

* cited by examiner

SYSTEMS AND METHODS FOR SMT PROCESSES USING UNINTERPRETED FUNCTION SYMBOLS

RELATED APPLICATION

This patent document claims priority under 35 U.S.C. § 119 and all other benefits from PCT Application No. PCT/US2017/026904, filed Apr. 11, 2017, the content of which is hereby incorporated by reference to the extent permitted by law.

TECHNICAL FIELD

The present disclosure is directed, in general, to computer-aided design, visualization, and manufacturing systems, product lifecycle management ("PLM") systems, and similar systems, that manage data for products and other items (collectively, "Product Data Management" systems or PDM systems).

BACKGROUND OF THE DISCLOSURE

PDM systems manage PLM and other data. The complexities of models managed by PDM systems makes comparison of different configuration models ineffective or impossible to perform manually and difficult to perform automatically. Improved systems are desirable.

SUMMARY OF THE DISCLOSURE

Various disclosed embodiments include systems and methods for satisfiability modulo theories (SMT) processes using uninterpreted function symbols. A method includes receiving a configuration model. The method includes computing a variant for the configuration model that includes a non-linear function. The method includes identifying input/output pairs in the non-linear function of the variant. The method includes executing a process on an external application for each input/output pair to produce an output value corresponding to each input of the input/output pairs. The method includes comparing the output value corresponding to each input of the input/output pairs with the output corresponding to each input of the input/output pairs. The method includes, when the output value corresponding to each input of the input/output pairs is equal to the output corresponding to each input of the input/output pairs, then the system stores an indication that the variant is correct.

Various embodiments include, when the output value corresponding to each input of the input/output pairs is not equal to the output corresponding to each input of the input/output pairs, then adding one or more constraints to the configuration model. Various embodiments include storing an updated configuration model included the added constraints. In some embodiments, identifying input/output pairs in the non-linear function of the variant is performed by an SMT solver. In some embodiments, the non-linear function is represented in an SMT solver as an uninterpreted function symbol. Various embodiments include adding additional constraints to the configuration model to limit a search space of an SMT computation.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
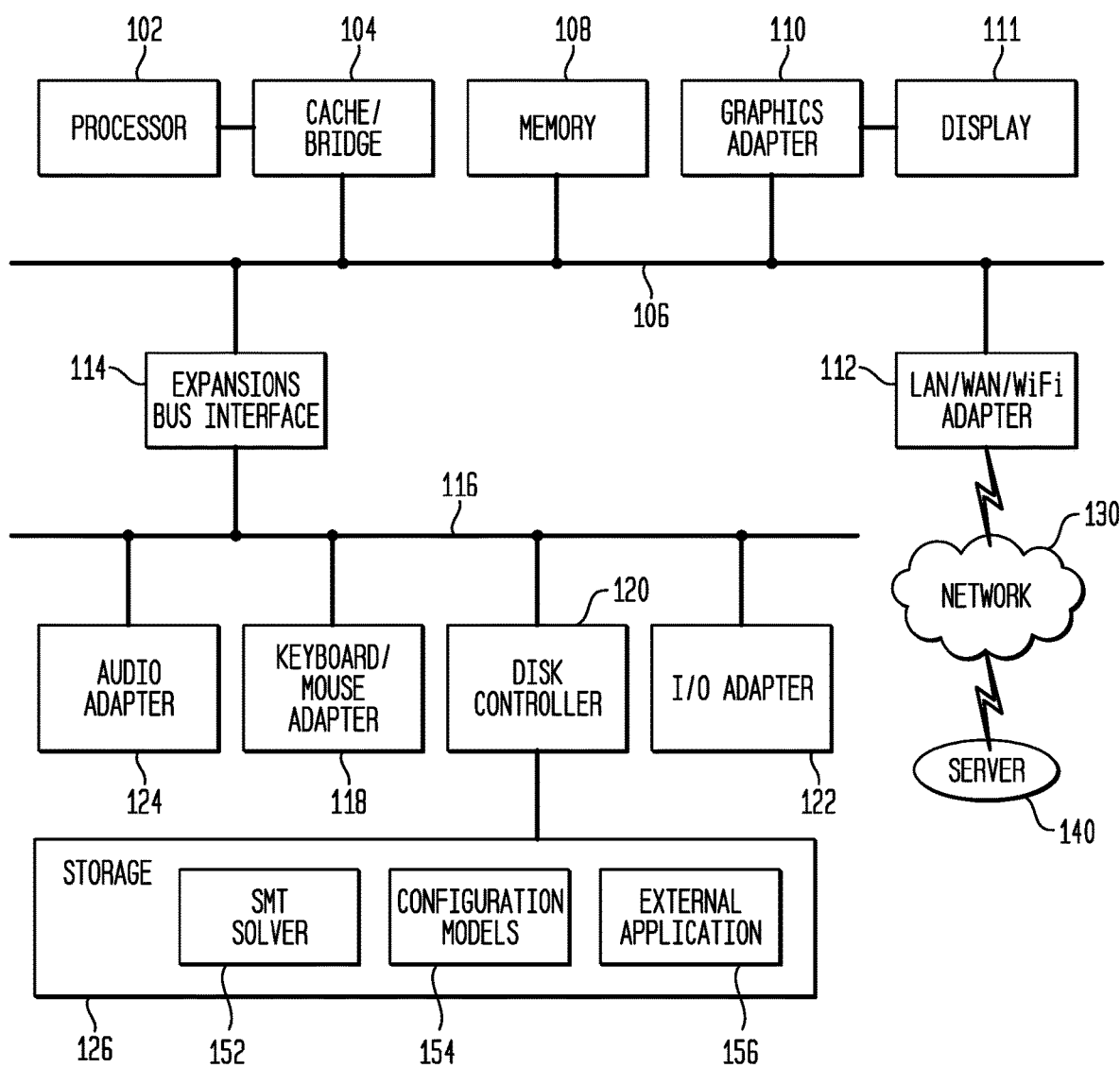
FIG. 1 illustrates a block diagram of a data processing system in which an embodiment can be implemented.
Figure 2:
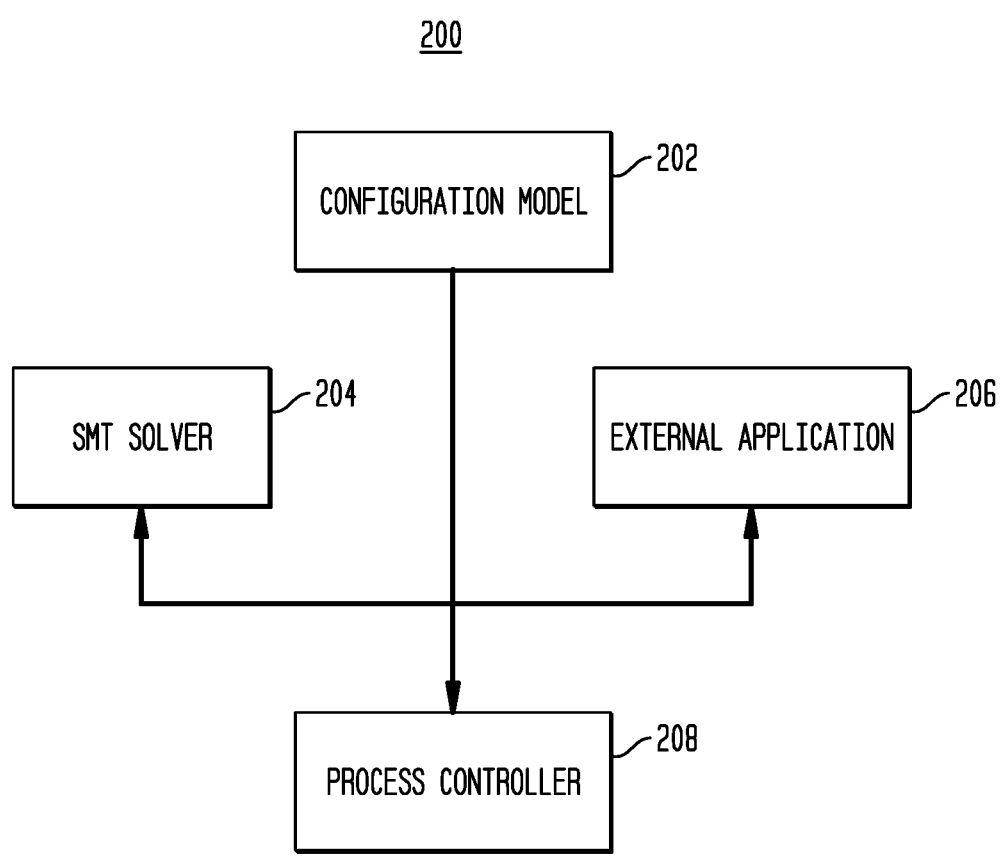
FIG. 2 illustrates logical elements used in a process as described herein.
Figure 3:
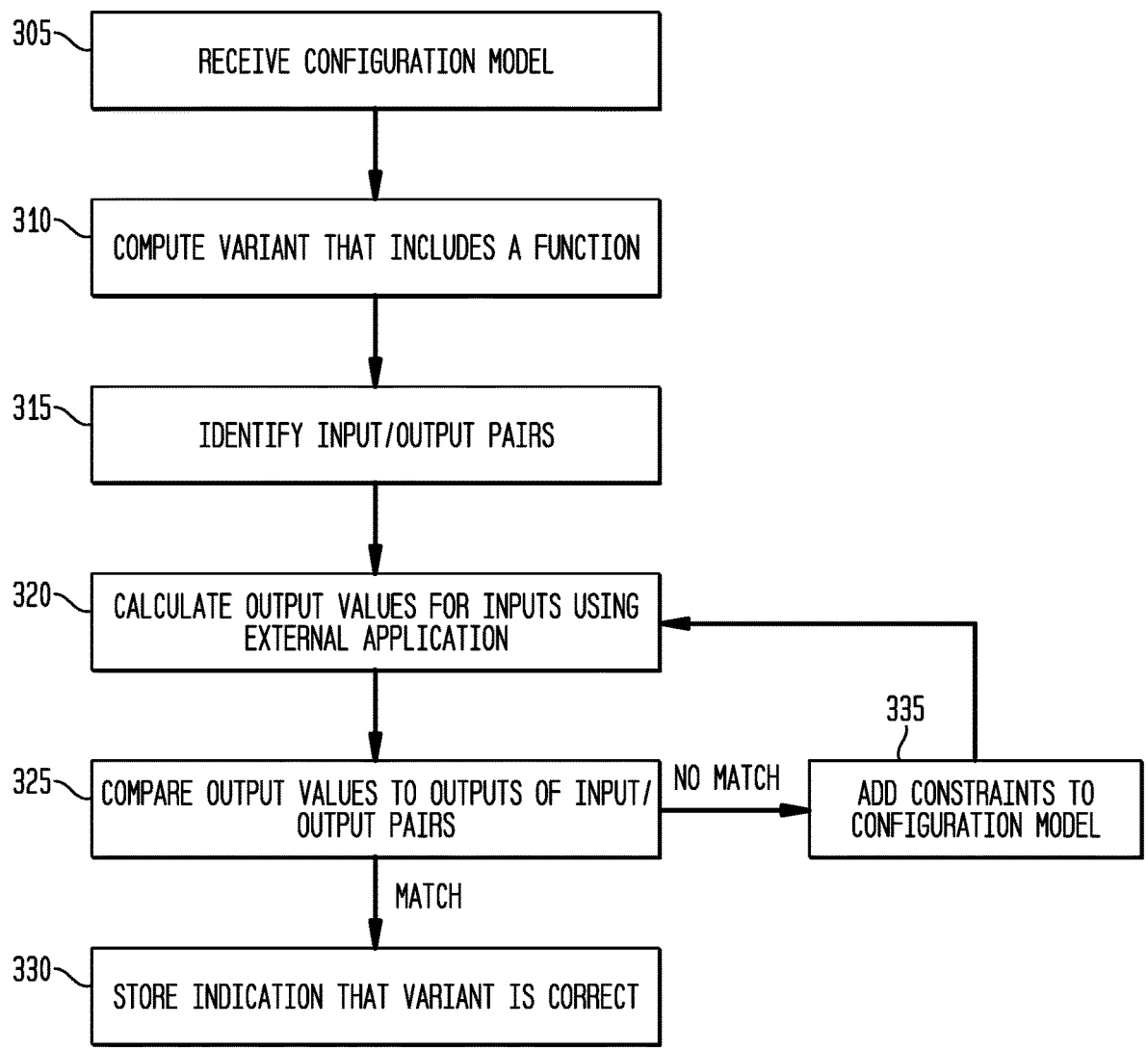
FIG. 3 illustrates a flowchart of a process in accordance with disclosed embodiments.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Configuration models like the ones typically used for the configuration of a car or a computer generally consist of a hierarchical tree of elements defining the structure of the model and constraints defining relationships between the elements of the model. These constraints consist mostly of implications, such as "if a, then b," or linear functions.

A satisfiability modulo theories solver can be used to check the satisfiability of a given configuration model. It is possible to derive all possible configurations (also called "variants") of a configuration model. If no variants can be derived from a configuration model, then the model is "inconsistent." An SMT solver can be used to compute the reason for the inconsistency.

In practice, non-linear functions are frequently used in Built-To-Order engineering tools like Rulestream® Engineer-to-Order software solution by Siemens Product Lifecycle Management Software Inc. (Plano, Tex., USA). Such engineering tools combine the usage of common linear models with mostly Boolean or Number variables with functions calculating non-linear algorithms with trigonometric parts, roots, squares, etc. For example, configuring a conveyor consists of an arbitrary number of functions calculating the needed motor power, the belt length, the rise (and other geometric figures) and so on.

Currently SMT solvers cannot properly handle non-linear functions. If a configuration model consists at least partly of trigonometric functions, for example, any SMT solver is overburdened and cannot compute a result.

Disclosed embodiments include systems and methods for extending SMT enhanced configuration processes using uninterpreted function symbols, and that can integrate non-linear functions into an SMT solver.

FIG. 1 illustrates a block diagram of a data processing system in which an embodiment can be implemented, for example as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Storage 126 can store such data as program code for an SMT solver 152, the configuration model 154, an external application 156, and other code, data, and other electronic information as described herein.

SMT solvers are known to those of skill in the art. Disclosed embodiments integrate non-linear functions into an SMT solver enhanced configuration process by feeding the solver with information it cannot assess by itself. The SMT solver can then cope with problems that it otherwise could not.

Once a problem (with non-linear functions) is encoded for the use of the SMT solver, the SMT solver can be used to compute a valid configuration, find inconsistencies, add customer specific constraints to find the needed configuration quicker, and perform other tasks that would otherwise be impossible when non-linear functions are used.

Disclosed embodiments combine non-linear functions into an SMT solver solving process by using the "uninterpreted function" symbol offered by some SMT solvers, such as the "Z3 Theorem Prover" software product, available at the time of filing from github.com/Z3Prover/z3. Uninterpreted function symbols are a theory that is used in SMT solvers to allow the solver to synthesize the semantics of a formula in order to find a satisfying assignment. Congruence closure techniques are used to achieve this. One could, for example, axiomatize Peano arithmetic using uninterpreted function symbols or for symbolic rewriting. Furthermore, one can use uninterpreted function symbols for limited ways of symbolic rewriting in SMT.

An uninterpreted function symbol for the SMT solver is the signature and name of a function. The SMT solver does not know anything about the semantical meaning behind this function symbol. If this function is used to assign a variable with an Integer value, the SMT solver "guesses" an outcome for each application of that function symbol. This "guess" may be right or not.

As an example, consider a configuration model with uninterpreted function symbols $f$ and $g$:

$$x,y,z \in \mathbb{N}$$

$$y = f(x)$$

$z = g(y)$ $1 \leq z \leq 10$

The semantics of the functions $f$ and g are defined as a routine in another program or third-party tool (the "external application"), and are to be integrated in the configuration model to be computed with the SMT solver. For this example, define:

$f(x) := 2x$ $g(x) := x - 1$

The external application, such as external application 156, can be stored in and executable by the same data processing system or a different data processing system; "external" refers to being external to the SMT solver itself.

A first variant computed by the SMT solver used may be as shown below in a table of interpreted values of the variables and functions of $f$ and g.

TABLE 1

| x | y | z | f(x) | g(x) |
|---|---|---|------|------|
| 1 | 1 | 1 | f(1) = 1 | g(1) = 1 |

The definitions $f(1) := 1$ and $g(1) := 1$ are chosen (or "guessed") by the SMT solver. Using these two function definitions, the SMT solver derived values for x, y and z as above.

The SMT solver does not know if the chosen function definitions are correct, but it assumes their correctness. The correctness of the function definitions must be checked outside of the SMT computation process.

Performing the calculations with the external application reveals that:

$f(1) := 2$ $g(1) = 0$

This proves that the chosen function definitions as shown in columns $f(x)$ and $g(x)$ and the variant computed by the SMT solver as shown in the Table 1 above are wrong.

With the information gathered by using the external application, the system can update the identified input/output pairs and add function definitions for $f(1)$ and $g(1)$:

$x, y, z \in \mathbb{N}$ $y = f(x)$ $z = g(y)$ $1 \leq z \leq 10$ $f(1) = 2$ $f(g) = 0$ Redoing the computation with the SMT solver, in this example, yield results as shown in Table 2, which illustrates interpreted values of the variables and functions of $f$ and g:

TABLE 2

| x | y | z | f(x) | g(x) |
|---|---|---|------|------|
| 1 | 2 | 1 | f(1) = 2 | g(1) = 0 |
|   |   |   |          | g(2) = 1 |

Performing the calculations with the external application reveals that:

$f(1) := 2$ $g(2) = 1$

This proves that the variant computed in Table 2 is a correct variant for the configuration model and the external application for $f$ and g, although $g(2) = 1$ was just a correct "guess" of the SMT solver.

By using uninterpreted function symbols and embedding external applications in the way disclosed above, a non-linear function can be incorporated into the SMT solve.

FIG. 2 depicts logical elements used in a process as described herein, and is referred to in conjunction with the process below.

FIG. 3 depicts a flowchart of a process in accordance with disclosed embodiments that may be performed, for example, by a PLM or PDM system, referred to generically as the "system" below. Such a process can find a valid variant for a given configuration model, including non-linear functions. In this example, the process is controlled by a process controller 208 implemented by the data processing system, such as a program application for determining a valid variant using configuration model 202, SMT solver 204, and external application 206.

The system receives a configuration model (305). "Receiving," as used herein, can include loading from storage, receiving from another device or process, receiving via an interaction with a user, or otherwise.

The system computes a variant for the configuration model that includes a function (310), such as a non-linear function. For this description, the variant is represented as v and the non-linear function is represented as F. F can be represented in the variant (and configuration model) as an uninterpreted function symbol. The configuration model is indicated as configuration model 202.

The system identifies input/output pairs in the non-linear function of the variant (315). This can be performed using an SMT solve by SMT solver 204. For this description let P represent all pairs with input $(x_1, x_2, \ldots, x_k)$ and corresponding output $(y_1, y_2, \ldots, y_n)$ of function F of v. In various embodiments, the SMT solver chooses input/output pairs to be tested/validated in the external process. Any identified input/output pairs can exclude any pairs processed on a previous iteration. The input/output pairs can represent the SMT solver's projected output for a given input based on the current configuration model.

While the particular example used herein is drawn a model that includes a non-linear function, disclosed embodiments are not restricted to non-linear functions but applies equally well for any other external program that produces outputs based on some input values.

The system executes a process on an external application for each input/output pair to produce an output value corresponding to each input of the input/output pairs (320). For this description, the system executes a process F' of the external application with input $(x_1, x_2, \ldots, x_k)$, and the output values are represented as $(z_1, z_2, \ldots, z_n)$. The external application is indicated as external application 206. The process can be executed multiple times in some embodiments, once for each pair being processed; in other cases, the process is executed for multiple pairs at the same time. On this process, the external function checks the SMT solver's projection of the output for a given input to determine if it is correct.

The system compares the output value corresponding to each input of the input/output pairs with the output corresponding to each input of the input/output pairs (325). For this description, $(y_1, y_2, \ldots, y_n)$ is compared to $(z_1, z_2, \ldots, z_n)$.

If the output value corresponding to each input of the input/output pairs is equal to the output corresponding to each input of the input/output pairs (MATCH), then the system stores an indication that the variant is correct (330), and the process ends. For this description, if $(y_1, y_2, \ldots, y_n)$ matches $(z_1, z_2, \ldots, z_n)$, then variant v with non-linear function F is correct. The system can also store an updated variant or configuration model with all of the added constraints.

If the output value corresponding to each input of the input/output pairs is not equal to the output corresponding to each input of the input/output pairs (NO MATCH), then the system adds one or more constraints to the configuration model (335), and the process repeats to 320. For this description, if $(y_1, y_2, \ldots, y_n)$ does not match $(z_1, z_2, \ldots, z_n)$, the system adds one or more constraints $F(x_1, x_2, \ldots, x_k) = (z_1, z_2, \ldots, z_n)$, and repeats the process to validate the updated variant v with non-linear function F. Each iteration can therefore validate new input/output pairs once the configuration model has been updated with the previous input/output pair constraints.

The process can be repeated as many times as necessary until the system determines that the variant v with non-linear function F is correct. Of course, if all constraints necessary to validate the result are added in the first pass, the process will only need to be performed once.

One significant technical improvement of processes as described herein is the use of information from external tools in a SMT enhanced configuration process. Another technical improvement includes seamless integration of third-party tools into SMT enhanced configuration processes.

Another technical improvement is that, as the whole model is computed in one step, it is possible to add constraints to any part of the configuration model in order to limit the search space of the SMT computation, such as limiting the possible interval of x and z in a configuration model. This provides a significant advantage in that it enables a user to define exactly which variant he is looking for before performing a search.

Another technical improvement is the ability to compute an optimized variant for a given objective in SMT enhanced configuration processes.

Using techniques as disclosed herein, and using intervals for the input and output parameters, it is also possible to examine dense domains (like real number) in polynomial time.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements to the specific examples disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims.

What is claimed is:

1. A method performed by a data processing system, comprising:

receiving a configuration model;

computing a variant for the configuration model that includes a non-linear function;

identifying input/output pairs in the non-linear function of the variant;

executing a process on an external application for each input/output pair to produce an output value corresponding to each input of the input/output pairs;

comparing the output value corresponding to each input of the input/output pairs with the output corresponding to each input of the input/output pairs; and when the output value corresponding to each input of the input/output pairs is equal to the output corresponding to each input of the input/output pairs, then storing an indication that the variant is correct.

2. The method of claim 1, further comprising, when the output value corresponding to each input of the input/output pairs is not equal to the output corresponding to each input of the input/output pairs, then adding one or more constraints to the configuration model.

3. The method of claim 2, further comprising storing an updated configuration model including the added constraints.

4. The method of claim 1, wherein identifying input/output pairs in the non-linear function of the variant is performed by a satisfiability modulo theories solver.

5. The method of claim 1, wherein the non-linear function is represented in a satisfiability modulo theories(SMT) solver as an uninterpreted function symbol.

6. The method of claim 1, further comprising adding additional constraints to the configuration model to limit a search space of an SMT computation.

7. A data processing system having at least a processor and an accessible memory, the data processing system configured to:
receive a configuration model;
compute a variant for the configuration model that includes a non-linear function;
identify input/output pairs in the non-linear function of the variant;
execute a process on an external application for each input/output pair to produce an output value corresponding to each input of the input/output pairs;
compare the output value corresponding to each input of the input/output pairs with the output corresponding to each input of the input/output pairs; and
when the output value corresponding to each input of the input/output pairs is equal to the output corresponding to each input of the input/output pairs, store an indication that the variant is correct.

8. The data processing system of claim 7, wherein the data processing system is further configured to, when the output value corresponding to each input of the input/output pairs is not equal to the output corresponding to each input of the input/output pairs, add one or more constraints to the configuration model.

9. The data processing system of claim 8, wherein the data processing system is further configured to store an updated configuration model including the added constraints.

10. The data processing system of claim 7, wherein identifying input/output pairs in the non-linear function of the variant is performed by a satisfiability modulo theories (SMT) solver.

11. The data processing system of claim 7, wherein the non-linear function is represented in a satisfiability modulo theories solver as an uninterpreted function symbol.

12. The data processing system of claim 7, wherein the data processing system is further configured to add additional constraints to the configuration model to limit a search space of a satisfiability modulo theories (SMT) computation.

13. A non-transitory machine-readable medium encoded with executable instructions that, when executed, cause a data processing system to:
receive a configuration model;
compute a variant for the configuration model that includes a non-linear function;
identify input/output pairs in the non-linear function of the variant;
execute a process on an external application for each input/output pair to produce an output value corresponding to each input of the input/output pairs;
compare the output value corresponding to each input of the input/output pairs with the output corresponding to each input of the input/output pairs; and
when the output value corresponding to each input of the input/output pairs is equal to the output corresponding to each input of the input/output pairs, store an indication that the variant is correct.

14. The non-transitory machine-readable medium of claim 13, further encoded with executable instructions to, when the output value corresponding to each input of the input/output pairs is not equal to the output corresponding to each input of the input/output pairs, add one or more constraints to the configuration model.

15. The non-transitory machine-readable medium of claim 13, further encoded with executable instructions to store an updated configuration model including the added constraints.

16. The non-transitory machine-readable medium of claim 13, wherein identifying input/output pairs in the non-linear function of the variant is performed by a satisfiability modulo theories (SMT) solver.

17. The non-transitory machine-readable medium of claim 13, wherein the non-linear function is represented in a satisfiability modulo theories solver as an uninterpreted function symbol.

18. The non-transitory machine-readable medium of claim 13, further encoded with executable instructions to add additional constraints to the configuration model to limit a search space of a satisfiability modulo theories (SMT) computation.

* * * * *